US010021679B2

(12) United States Patent
Yokomakura et al.

(10) Patent No.: US 10,021,679 B2
(45) Date of Patent: Jul. 10, 2018

(54) TERMINAL DEVICE, BASE STATION APPARATUS, INTEGRATED CIRCUIT, AND COMMUNICATION METHOD

(71) Applicant: Sharp Kabushiki Kaisha, Sakai-shi, Osaka (JP)

(72) Inventors: Kazunari Yokomakura, Sakai (JP); Shoichi Suzuki, Sakai (JP); Tatsushi Aiba, Sakai (JP); Hiroki Takahashi, Sakai (JP); Kimihiko Imamura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/116,864

(22) PCT Filed: Mar. 18, 2015

(86) PCT No.: PCT/JP2015/058033
§ 371 (c)(1),
(2) Date: Aug. 5, 2016

(87) PCT Pub. No.: WO2015/141715
PCT Pub. Date: Sep. 24, 2015

(65) Prior Publication Data
US 2017/0135072 A1    May 11, 2017

(30) Foreign Application Priority Data
Mar. 20, 2014   (JP) .................................. 2014-058164

(51) Int. Cl.
*H04W 72/04*     (2009.01)
*H04W 8/00*      (2009.01)
*H04W 76/11*     (2018.01)

(52) U.S. Cl.
CPC ......... *H04W 72/042* (2013.01); *H04W 8/005* (2013.01); *H04W 76/11* (2018.02)

(58) Field of Classification Search
CPC . H04W 72/042; H04W 76/021; H04W 8/005; H04W 76/11
See application file for complete search history.

(56) References Cited

U.S. PATENT DOCUMENTS

| 2011/0268006 A1 | 11/2011 | Koskela et al. | |
| 2013/0039324 A1* | 2/2013 | Kwon | H04W 72/04 370/329 |

(Continued)

OTHER PUBLICATIONS

Official Communication issued in International Patent Application No. PCT/JP2015/058033, dated Jun. 16, 2015.

(Continued)

*Primary Examiner* — Gary Mui
(74) *Attorney, Agent, or Firm* — Keating & Bennett, LLP

(57) ABSTRACT

There is provided a terminal device that performs first communication with E-UTRAN, and second communication between terminal devices, the terminal device including: a reception unit that receives information relating to resource allocation for the second communication and Downlink Control Information in which information relating to a transmission terminal is included, over a downlink in the first communication, and that performs reception processing in the second communication based on the information relating to the resource allocation; and a transmission unit that performs transmission processing in the second communication based on the information relating to the resource allocation, in which, which one of the reception processing and the transmission processing that are based on the information relating to the resource allocation is performed is determined based on a control information format.

4 Claims, 7 Drawing Sheets

(56) References Cited

U.S. PATENT DOCUMENTS

| | | | |
|---|---|---|---|
| 2013/0235820 A1* | 9/2013 | Wu | H04W 76/023 |
| | | | 370/329 |
| 2013/0322413 A1 | 12/2013 | Pelletier et al. | |
| 2014/0023008 A1 | 1/2014 | Ahn et al. | |
| 2015/0139136 A1* | 5/2015 | Zhang | H04W 72/12 |
| | | | 370/329 |
| 2015/0181406 A1* | 6/2015 | Seo | H04W 76/023 |
| | | | 370/329 |
| 2016/0192424 A1* | 6/2016 | Suzuki | H04W 8/005 |
| | | | 370/328 |
| 2017/0250845 A1* | 8/2017 | Suzuki | H04L 27/2607 |

OTHER PUBLICATIONS

"3rd Generation Partnership Project; Technical Specification Group Radio Access Network; Study on LTE Device to Device Proximity Services; Radio Aspects (Release 12)," 3GPP TR 36.843 V1.2.0, Feb. 2014, pp. 1-49.

Huawei et al., "Resource assignment for D2D communication", 3GPP TSG RAN WG1 Meeting #75, R1-135042, Nov. 11-15, 2013, pp. 1-5.

\* cited by examiner

TERMINAL DEVICE, BASE STATION APPARATUS, INTEGRATED CIRCUIT, AND COMMUNICATION METHOD

TECHNICAL FIELD

The present invention relates to a terminal device, a base station apparatus, an integrated circuit, and a communication method.

This application claims the benefit of Japanese Priority Patent Application No. 2014-058164 filed on Mar. 20, 2014, the entire contents of which are incorporated herein by reference.

BACKGROUND ART

In the 3rd Generation Partnership Project (3GPP), a radio access scheme (Evolved Universal Terrestrial Radio Access (EUTRA)) and a radio access network (Evolved Universal Terrestrial Radio Access Network (EUTRAN)) for cellular mobile communication have been considered. EUTRA and EUTRAN are also referred to as Long Term Evolution (LTE). In LTE, a base station apparatus is also referred to as an evolved NodeB (eNodeB) and a terminal device is also referred to as a User Equipment (UE). LTE is a cellular communication system in which an area is divided in a cellular pattern into multiple cells, each being covered by a base station apparatus. A single base station apparatus may manage multiple cells.

In 3GPP, Proximity Services (ProSe) have been considered. ProSe includes ProSe discovery and ProSe communication. The ProSe discovery is a process that, using EUTRA, specifies that a terminal device is in proximity to a different terminal device. The ProSe communication is communication between two terminals that are in proximity to each other using a EUTRAN communication path that is established between the two terminal devices. For example, the communication path may be established directly between the terminal devices.

The ProSe discovery and the ProSe communication are also referred to as D2D discovery and D2D communication, respectively. The D2D discovery and the D2D communication are collectively also referred to as D2D.

In NPL 1, it is disclosed that a subset of resource blocks is reserved for the D2D, that a network configures a set of D2D resources, and that the terminal device is allowed to transmit a D2D signal using the configured resources.

CITATION LIST

Non-Patent Literature

NPL 1: "Study on LTE Device to Device Proximity Services; Radio Aspects (Release 12)", 3GPP TR36.843 v.1.2.0., February, 2014

DISCLOSURE OF THE INVENTION

Problems to be Solved by the Invention

However, a procedure that is to be executed when performing transmission and reception of the D2D signal is not sufficiently considered. Several aspects of the present invention are provided in view of the problem described above. An object of the invention is to provide a terminal device that is capable of efficiently performing transmission and reception of a D2D signal, a base station apparatus that controls the terminal device, an integrated circuit that is built into the terminal device, a communication method that is used in the terminal device, and a communication method that is used in the base station apparatus.

Means for Solving the Problems (1) In order to accomplish the object described above, the following means are contrived according to several aspects of the present invention. That is, according to a first aspect of the present invention, there is provided a terminal device that performs first communication with E-UTRAN, and second communication between terminal devices, the terminal device including: a reception unit that receives information relating to resource allocation for the second communication and Downlink Control Information in which information relating to a transmission terminal is included, over a downlink in the first communication, and that performs reception processing in the second communication based on the information relating to the resource allocation; and a transmission unit that performs transmission processing in the second communication based on the information relating to the resource allocation, in which, which one of the reception processing and the transmission processing that are based on the information relating to the resource allocation is performed is determined based on a control information format.

(2) Furthermore, in the terminal device according to the first aspect, which is a terminal device that communicates with a base station apparatus, a CRC parity bit that is scrambled by an RNTI which is different from an RNTI that is configured for the first communication may be attached to the Downlink Control Information.

(3) Furthermore, according to a second aspect of the present invention, there is provided a base station apparatus that communicates with a terminal device, the base station apparatus performing: transmission of information relating to resource allocation and Downlink Control Information in which information relating to a transmission terminal is included, to the terminal device, in which, in communication between terminal devices among which there is the terminal device, the information relating to the transmission terminal is used for determining which one of the reception processing and the transmission processing that are based on the information relating to the resource allocation is performed.

(4) Furthermore, according to a third aspect of the present invention, there is provided an integrated circuit that is built into a terminal device which performs first communication with E-UTRAN, and second communication between terminal devices, the integrated circuit including: a function of receiving information relating to resource allocation for the second communication and Downlink Control Information in which information relating to a transmission terminal is included, over a downlink in the first communication, and of performing reception processing in the second communication based on the information relating to the resource allocation; and a function of performing transmission processing in the second communication based on the information relating to the resource allocation, in which, which one of the reception processing and the transmission processing that are based on the information relating to the resource allocation is performed is determined based on a control information format.

(5) Furthermore, according to a fourth aspect of the present invention, there is provided an integrated circuit that is built into a base station apparatus that communicates with a terminal device, the integrated circuit including: a function of transmitting information relating to resource allocation and Downlink Control Information in which information relating to a transmission terminal is included, to the terminal device, in which, in communication between terminal devices among which there is the terminal device, the information relating to the transmission terminal is used for determining which one of the reception processing and the transmission processing that are based on the information relating to the resource allocation is performed.

(6) Furthermore, according to a fifth aspect of the present invention, there is provided a communication method that is used in a terminal device which performs first communication with E-UTRAN, and second communication between terminal devices, the communication method including: a method of receiving information relating to resource allocation for the second communication and Downlink Control Information in which information relating to a transmission terminal is included, over a downlink in the first communication, and of performing reception processing in the second communication based on the information relating to the resource allocation; and a transmission method of performing transmission processing in the second communication based on the information relating to the resource allocation, in which, which one of the reception processing and the transmission processing that are based on the information relating to the resource allocation is performed is determined based on a control information format.

(7) Furthermore, according to a sixth aspect of the present invention, there is provided a communication method, which is a communication method for use in a base station apparatus that communicates with a terminal device, including a transmission method of transmitting information relating to resource allocation and Downlink Control Information in which information relating to a transmission terminal is included, to the terminal device, in which, in communication between terminal devices among which there is the terminal device, the information relating to the transmission terminal is used for determining which one of the reception processing and the transmission processing that are based on the information relating to the resource allocation is performed.

Effects of the Invention

According to several aspects of the invention, transmission and reception of a D2D signal can efficiently be performed.

MODE FOR CARRYING OUT THE INVENTION

An embodiment of the present invention will be described below.

According to the present embodiment, one or multiple cells are configured for a terminal device. A technology in which a terminal device performs communication through multiple cells is referred to as cell aggregation or carrier aggregation. The present invention may be applied to each of the multiple cells that are configured for the terminal device. Furthermore, the present invention may be applied to some of the multiple cells that are configured. A cell that is configured for the terminal device is also referred to as a serving cell.

Multiple serving cells that are configured include one primary cell, or one or multiple secondary cells. The primary cell is a serving cell in which an initial connection establishment procedure is executed, a serving cell in which a connection re-establishment procedure is started, or a cell that is indicated as a primary cell during a handover procedure. At a point in time at which a Radio Resource Control (RRC) connection is established, or later, the secondary cell may be configured.

In the case of the cell aggregation, a Time Division Duplex (TDD) scheme or a Frequency Division Duplex (FDD) scheme may be applied to all multiple cells. Furthermore, a cell to which the TDD scheme is applied and a cell to which the FDD scheme is applied may be aggregated.

Figure 1:
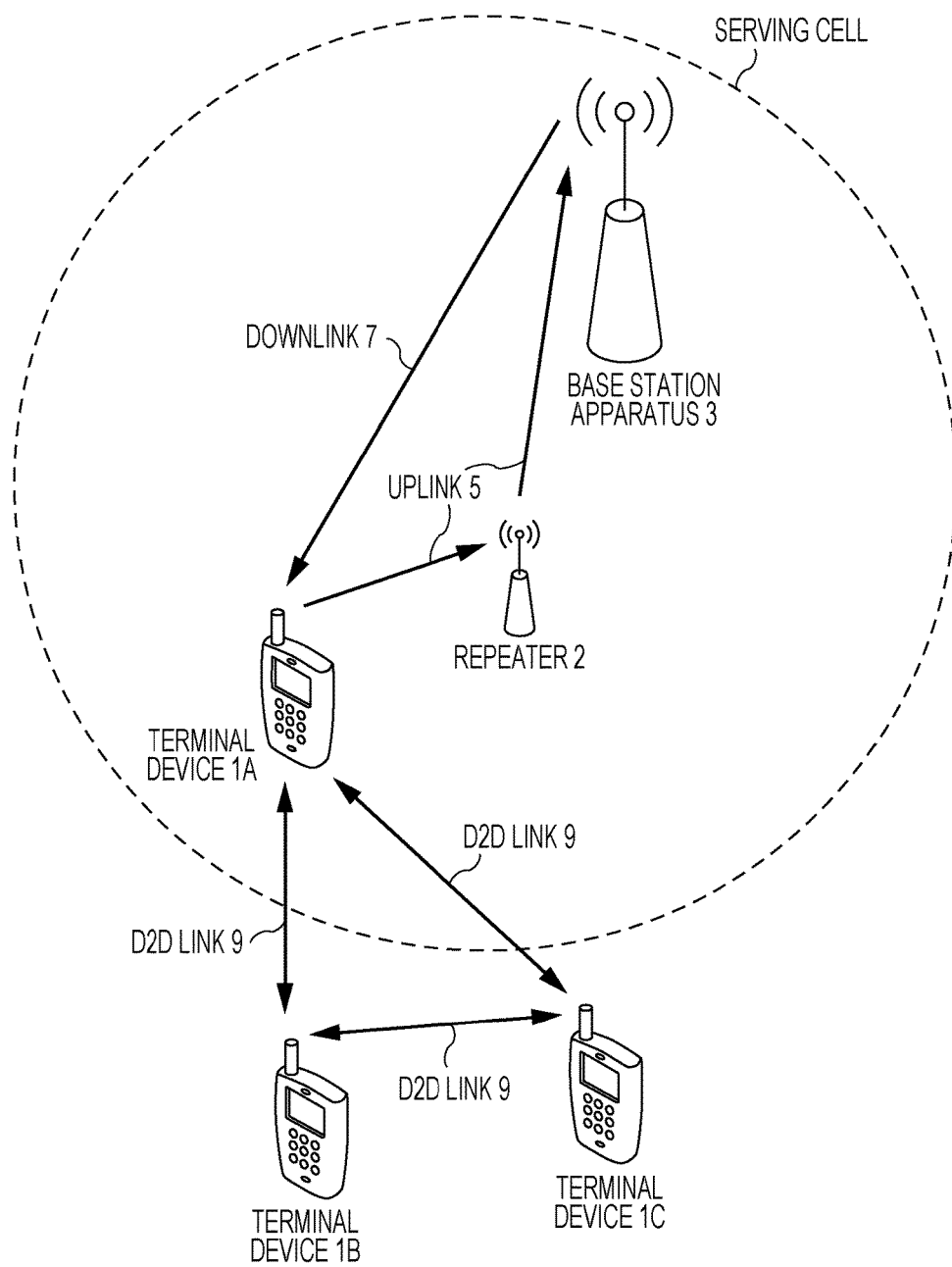
FIG. 1 is a conceptual diagram of a wireless communication system according to the present embodiment.

FIG. 1 is a conceptual diagram of a wireless communication system according to the present embodiment. In FIG. 1, the wireless communication system includes terminal devices 1A to 1C, a repeater 2, and a base station apparatus 3. The terminal devices 1A to 1C are referred to as a terminal device 1. The repeater 2 has a function of amplifying a signal that is received from the terminal device 1 and transmitting the amplified signal. A serving cell 4 indicates an area that is covered by the base station apparatus 3 (LTE).

An uplink 5 is a link from the terminal device 1 to the base station apparatus 3. Moreover, in the uplink 5, a signal may be transmitted directly from the terminal device 1 to the base station apparatus 3 without involving the repeater. A downlink 7 is a link from the base station apparatus 3 to the terminal device 1. Furthermore, the uplink 5 and the downlink 7 are referred to as a cellular link or a cellular communication path. Furthermore, communication between the terminal device 1 and the base station apparatus 3 is also referred to as cellular communication.

A D2D link 9 is a link between the terminal devices 1. Moreover, the D2D link 9 is also referred to as a D2D communication path, a ProSe link, or ProSe communication path. D2D discovery and D2D communication are performed over the D2D link 9. The D2D discovery is a process/procedure that specifies that terminal device 1 is in proximity to a different terminal device 1 using EUTRA. The D2D communication is communication between two terminal devices 1 that are in proximity to each other using an EUTRAN communication path that is established between the two terminal devices 1. For example, the communication path may be established directly between the terminal devices 1.

Moreover, the D2D link 9 may include a ProSe-assisted Wireless Local Area Network (WLAN) direct channel. For example, two terminal devices 1 that are in proximity to each other may be discovered based on the D2D discovery, EUTRAN may provide configuration information on WLAN to the two terminal devices 1, and the two terminal devices 1 may establish the ProSe-assisted WLAN direct communication path. For example, the two terminal devices 1 that are in proximity to each other may be discovered based on the D2D discovery that uses EUTRAN, and the EUTRAN communication path or the ProSe-assisted Wireless Local Area Network (WLAN) direct communication path may be established between the two terminal devices 1 that are discovered.

A physical channel and a physical signal according to the present embodiment are described.

A downlink physical channel and a downlink physical signal are collectively referred to as a downlink signal. An uplink physical channel and an uplink physical signal are collectively referred to as an uplink signal. The physical channel is used for transmitting information that is output from a higher layer. The physical signal is not used for transmitting the information that is output from the higher layer, but is used by a physical layer.

In FIG. 1, the following uplink physical channels are used for uplink wireless communication.

Physical Uplink Control Channel (PUCCH)
Physical Uplink Shared Channel (PUSCH)
Physical Random Access Channel (PRACH)

The PUCCH is a physical channel that is used for transmitting Uplink Control Information (UCI). Pieces of Uplink Control Information include Channel State Information (CSI) for downlink, a Scheduling Request (SR) indicating a request for a PUSCH resource, and an acknowledgement (ACK)/negative-acknowledgement (NACK) of downlink data (a Transport block or a Downlink-Shared Channel (DL-SCH)). The ACK/NACK is also referred to as a HARQ-ACK or HARQ feedback.

The PUSCH is a physical channel that is used for transmitting uplink data (Uplink-Shared Channel (UL-SCH)) and/or the HARQ-ACK and/or the Channel State Information.

The PRACH is a physical channel that is used for transmitting a random access preamble. The PRACH is used for the initial connection establishment procedure, the handover procedure, and the connection re-establishment procedure.

In FIG. 1, the following uplink physical signals are used for the uplink wireless communication.

Uplink Reference Signal (UL RS)

According to the present embodiment, the following two types of Uplink Reference Signals are used.

Demodulation Reference Signal (DMRS)
Sounding Reference Signal (SRS)

The DMRS is associated with transmission of the PUSCH or the PUCCH. The DMRS is time-multiplexed along with the PUSCH or the PUCCH. The base station apparatus 3 uses the DMRS in order to perform channel reconfiguration of the PUSCH or the PUCCH. Transmission of both of the PUSCH and the DMRS is referred to simply as transmission of the PUSCH. Transmission of both of the PUCCH and the DMRS is referred to simply as transmission of the PUCCH. The SRS is not associated with the transmission of the PUSCH or the PUCCH. The base station apparatus 3 uses the SRS in order to measure an uplink channel state.

In FIG. 1, the following downlink physical channels are used for downlink wireless communication.

Physical Broadcast Channel Physical (PBCH)
Physical Control Format Indicator Channel (PCFICH)
Physical Hybrid automatic repeat request Indicator Channel (PHICH)
Physical Downlink Control Channel (PDCCH)
Enhanced Physical Downlink Control Channel (EPDCCH)
Physical Downlink Shared Channel (PDSCH)
Physical Multicast Channel (PMCH)

The PBCH is used for broadcasting a Master Information Block (MIB) (Broadcast Channel (BCH)) that is used in a shared manner in the terminal device 1. The MIB is transmitted at intervals of 40 ms, and the MIB is repeatedly transmitted with a periodicity of 10 ms. For example, the MIB includes information indicating an SFN. The system frame number (SFN) is a radio frame number. The MIB is system information.

The PCFICH is used for transmitting information that indicates a region (an OFDM symbol) which is used for transmission of the PDCCH.

The PHICH is used for transmitting an HARQ indicator (the HARQ feedback) indicating an ACKnowledgement (ACK) of or a Negative ACKnowledgement (NACK) of the uplink data (Uplink Shared Channel (UL-SCH)) that is received by the base station apparatus 3.

The PDCCH and the EPDCCH are used for transmitting Downlink Control Information (DCI). The Downlink Control Information is also referred to as a DCI format. The Downlink Control Information includes a downlink grant and an uplink grant. The downlink grant is also referred to as downlink assignment or downlink allocation.

The uplink grant is used for scheduling of a single PUSCH within a single cell. The uplink grant is used for the scheduling of a single PUSCH within a certain subframe. The downlink grant is used for scheduling of a single PDSCH within a single cell. The downlink grant is used for scheduling of the PDSCH within a subframe that is the same as the subframe in which the downlink grant is transmitted.

A Cyclic Redundancy Check (CRC) parity bit is attached to the DCI format. The CRC parity bit is scrambled with a Cell-Radio Network Temporary Identifier (C-RNTI) or a Semi-Persistent Scheduling Cell-Radio Network Temporary Identifier (SPS C-RNTI). The C-RNTI and the SPS C-RNTI are identifiers for identifying a terminal device 1 within a cell. The C-RNTI is used for controlling scheduling of the PDSCH or a resource for the PUSCH within a single subframe. The SPS C-RNTI is used for periodically allocating a resource for the PDSCH or the PUSCH.

The PDSCH is used for transmitting the downlink data (Downlink Shared Channel (DL-SCH)).

The PMCH is used for transmitting multicast data (Multicast Channel (MCH)).

In FIG. 1, the following downlink physical signals are used for the downlink wireless communication.

Synchronization Signal (SS)
Downlink Reference Signal (DL RS)

The synchronization signal is used in order for the terminal device 1 to be synchronized to a frequency domain and a time domain for the downlink. In the FDD scheme, the synchronization signal is mapped to subframes 0 and 5 within the radio frame.

The Downlink Reference Signal is used in order for the terminal device 1 to perform the channel reconfiguration of the downlink physical channel. The Downlink Reference Signal is used in order for the terminal device 1 to calculate the Channel State Information for the downlink. The Downlink Reference Signal is used in order for the terminal device 1 to measure a geographical location of the terminal device 1 itself.

According to the present embodiment, the following five types of Downlink Reference Signals are used.

Cell-specific Reference Signal (CRS)

UE-specific Reference Signal (URS) associated with the PDSCH

Demodulation Reference Signal (DMRS) associated with the EPDCCH

Non-Zero Power Chanel State Information—Reference Signal (NZP CSI-RS)

Zero Power Chanel State Information—Reference Signal (ZP CSI-RS)

Multimedia Broadcast and Multicast Service over Single Frequency Network Reference Signal (MBSFN RS)

The CRS is transmitted in an entire band for a subframe. The CRS is used for performing demodulation of the PBCH/PDCCH/PHICH/PCFICH/PDSCH. The CRS may be used in order for the terminal device 1 to calculate the Channel State Information for the downlink. The PBCH/PDCCH/PHICH/PCFICH is transmitted on an antenna port that is used for transmission of the CRS.

The URS associated with the PDSCH is transmitted in a subframe and in a band. The subframe and the band are used for transmission of the PDSCH with which the URS is associated. The URS is used for performing the demodulation of the PDSCH with which the URS is associated. The PDSCH is transmitted on an antenna port that is used for the transmission of the CRS or on antenna port that is used for transmission of the URS.

The DMRS associated with the EPDCCH is transmitted in a subframe and a band that are used for transmission of the EPDCCH with which the DMRS is associated. The DMRS is used for performing demodulation of the EPDCCH with which the DMRS is associated. The EPDCCH is transmitted on an antenna port that is used for transmission of the DMRS.

The NZP CSI-RS is transmitted on a subframe that is configured. A resource on which the NZP CSI-RS is transmitted is configured by the base station apparatus 3. The NZP CSI-RS is used in order for the terminal device 1 to calculate the Channel State Information for the downlink. The terminal device 1 performs signal measurement (channel measurement) using the NZP CSI-RS.

A resource for the ZP CSI-RS is configured by the base station apparatus 3. With a zero output, the base station apparatus 3 transmits the ZP CSI-RS. More precisely, the base station apparatus 3 does not transmit the ZP CSI-RS. The base station apparatus 3 does not transmit the PDSCH and the EPDCCH on a resource on which the ZP CSI-RS is configured. For example, the terminal device 1 can measure interference in a resource to which the NZP CSI-RS corresponds in a certain cell.

The MBSFN RS is transmitted in an entire band for a subframe that is used for transmission of the PMCH. The MBSFN RS is used for performing demodulation of the PMCH. The PMCH is transmitted on an antenna port that is used for transmission of the MBSFN RS.

In FIG. 1, for wireless communication over the D2D link 9 between the terminal devices 1, the downlink signal, the uplink signal, or a signal (the physical channel and the physical signal) that is newly defined for D2D may be used. A signal (the physical channel and the physical signal) that is transmitted and received over the D2D link 9 is also referred to as a signal that is used for the D2D, a signal for the D2D, or a D2D signal.

The BCH, the MCH, the UL-SCH, and the DL-SCH are transport channels. A channel that is used in a Medium Access Control (MAC) layer is referred to as a transport channel. A unit of data for the transport channel that is used in the MAC layer is also referred to as a transport block (TB) or a MAC Protocol Data Unit (PDU). Control of a Hybrid Automatic Repeat Request (HARQ) is performed for every transport block in the MAC layer. The transport block is a unit of data that the MAC layer delivers to the physical layer. In the physical layer, the transport block is mapped to a codeword, and coding processing is performed on every codeword.

A structure of the radio frame according to the present embodiment is described.

In LTE, two structures of the radio frame are supported. The two structures of the radio frame are frame structure type 1 and frame structure type 2. Frame structure type 1 is applicable to FDD. Frame structure type 2 is applicable to TDD.

Figure 2:
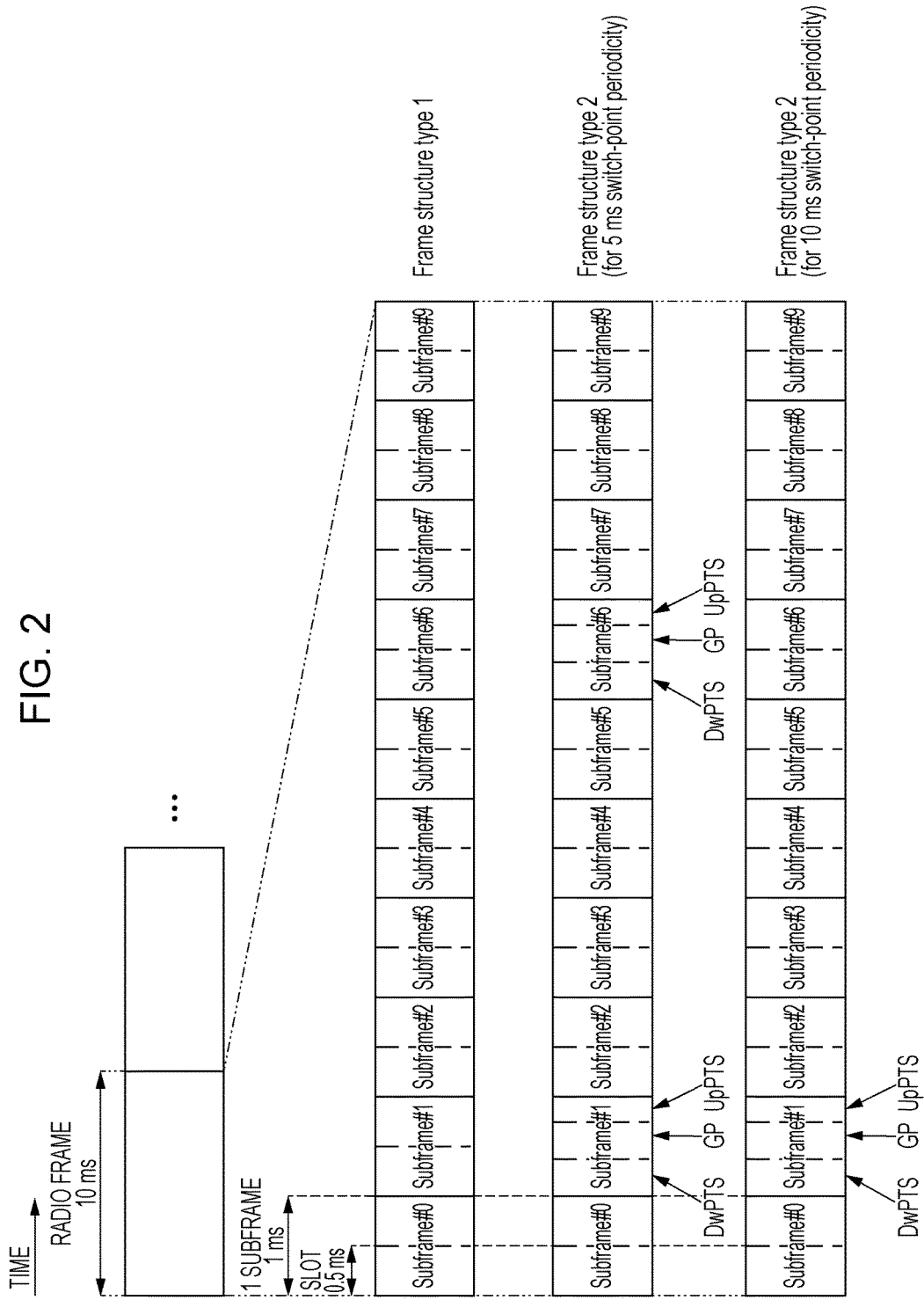
FIG. 2 is a diagram illustrating a schematic constitution of a radio frame according to the present embodiment.

FIG. 2 is a diagram illustrating a schematic constitution of the radio frame according to the present embodiment. In FIG. 2, the horizontal axis is a time axis. Furthermore, each of the radio frames of type 1 and type 2 is 10 ms long, and is defined by 10 subframes. Each of the subframes is 1 ms long, and is defined by two consecutive slots. Each of the slots is 0.5 ms long. An i-th subframe within the radio frame is constituted from a (2×i)-th slot and a (2×i+1)-th slot.

The following three types of subframes are defined for frame structure type 2.

Downlink Subframe

Uplink Subframe

Special Subframe

The downlink subframe is a subframe that is reserved for downlink transmission. The uplink subframe is a subframe that is reserved for uplink transmission. The special subframe is configured from three fields. The three fields are a Downlink Pilot Time Slot (DwPTS), a Guard Period (GP), and an Uplink Pilot Time Slot (UpPTS). A sum of lengths of the DwPTS, the GP, and the UpPTS is 1 ms long. The DwPTS is a field that is reserved for the downlink transmission. The UpPTS is a field that is reserved for the uplink transmission. The GP is a field, the downlink transmission and the uplink transmission on which are not performed. Moreover, the special subframe may be constituted only from the DwPTS and the GP, and may be constituted only from the GP and the UpPTS.

A radio frame of frame structure type 2 is constituted at least from the downlink subframe, the uplink subframe, and the special subframe.

A constitution of the slot according to the present embodiment is described.

Figure 3:
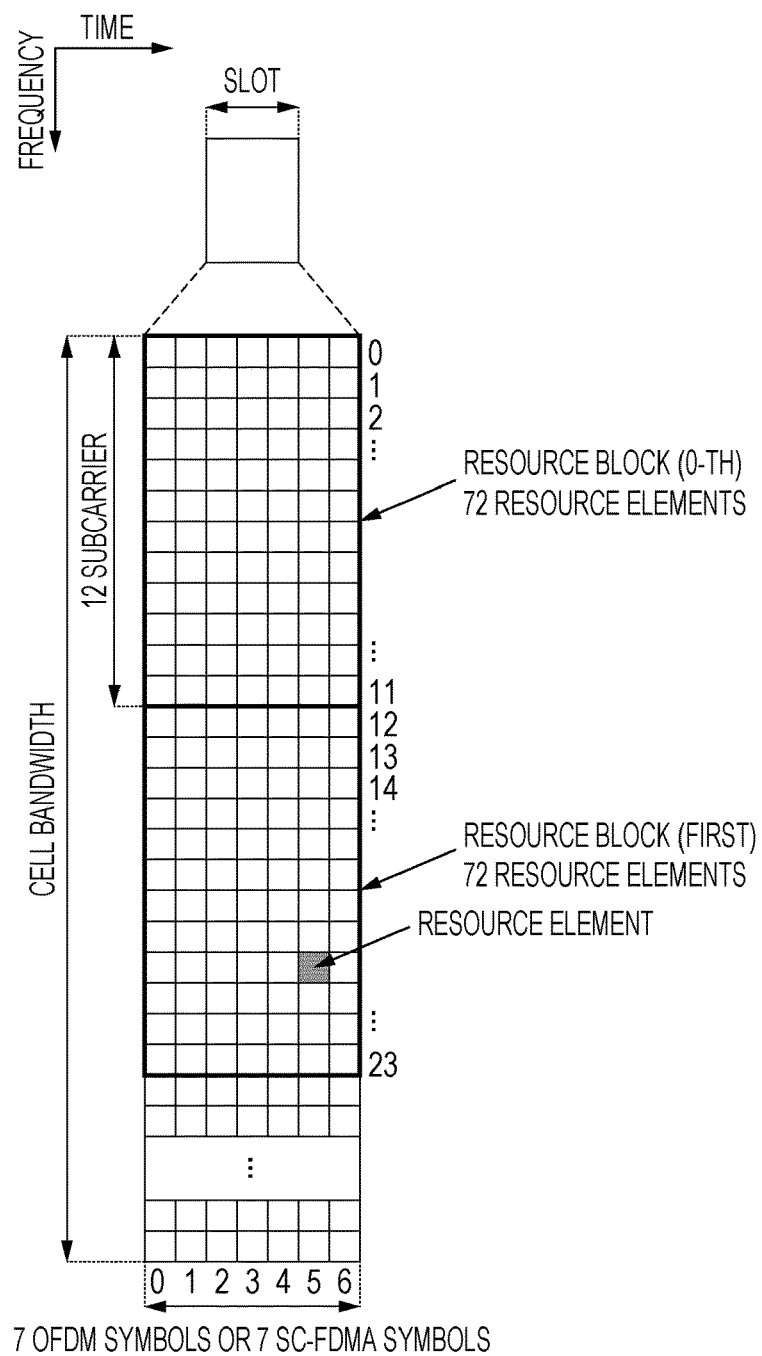
FIG. 3 is a diagram illustrating a constitution of a slot according to the present embodiment.

FIG. 3 is a diagram illustrating a constitution of the slot according to the represent embodiment. In FIG. 3, a normal Cyclic Prefix (CP) is applied to the OFDM symbol or an SC-FDMA symbol. The physical signal or the physical channel that is transmitted on each of the slots is expressed by a resource grid. In FIG. 3, the horizontal axis is a time axis and the vertical axis is a frequency axis. In the downlink, the resource grid is defined by multiple subcarriers and multiple OFDM symbols. In uplink, the resource grid is defined by multiple subcarriers and multiple SC-FDMA symbols. For example, in a D2D link, the resource grid may be defined by multiple subcarriers and multiple SC-FDMA symbols. The number of subcarriers that constitute one slot depends on a cell bandwidth. The number of OFDM symbols or SC-FDMA symbols that constitute one slot is 7. Each of the elements within the resource grid is referred to as a resource element. The resource element is identified using a subcarrier number and an OFDM symbol, or SC-FDMA symbol number.

A resource block is used for expressing mapping of a certain physical channel (the PDSCH, the PUSCH, or the like) to resource elements. The resource block is defined by a virtual resource block and a physical resource block. A certain physical channel is first mapped to the virtual resource block. Thereafter, the virtual resource block is mapped to the physical resource block. One physical resource block is defined by 7 consecutive OFDM symbols or SC-FDMA symbols in the time domain and by 12 consecutive subcarriers in the frequency domain. Therefore, one physical resource block is constituted from (7×12) resource elements. Furthermore, one physical resource block corresponds to one slot in the time domain, and corresponds to 180 kHz in the frequency domain. The physical resource blocks are numbered from 0 in the frequency domain.

Moreover, an extended CP may be applied to the OFDM symbol or the SC-FDMA symbol. In the case of the extended CP, the number of OFDM symbols or SC-FDMA symbols that constitute one slot is 7.

An arrangement of the physical channel and the physical signal according to the present embodiment is described.

Figure 4:
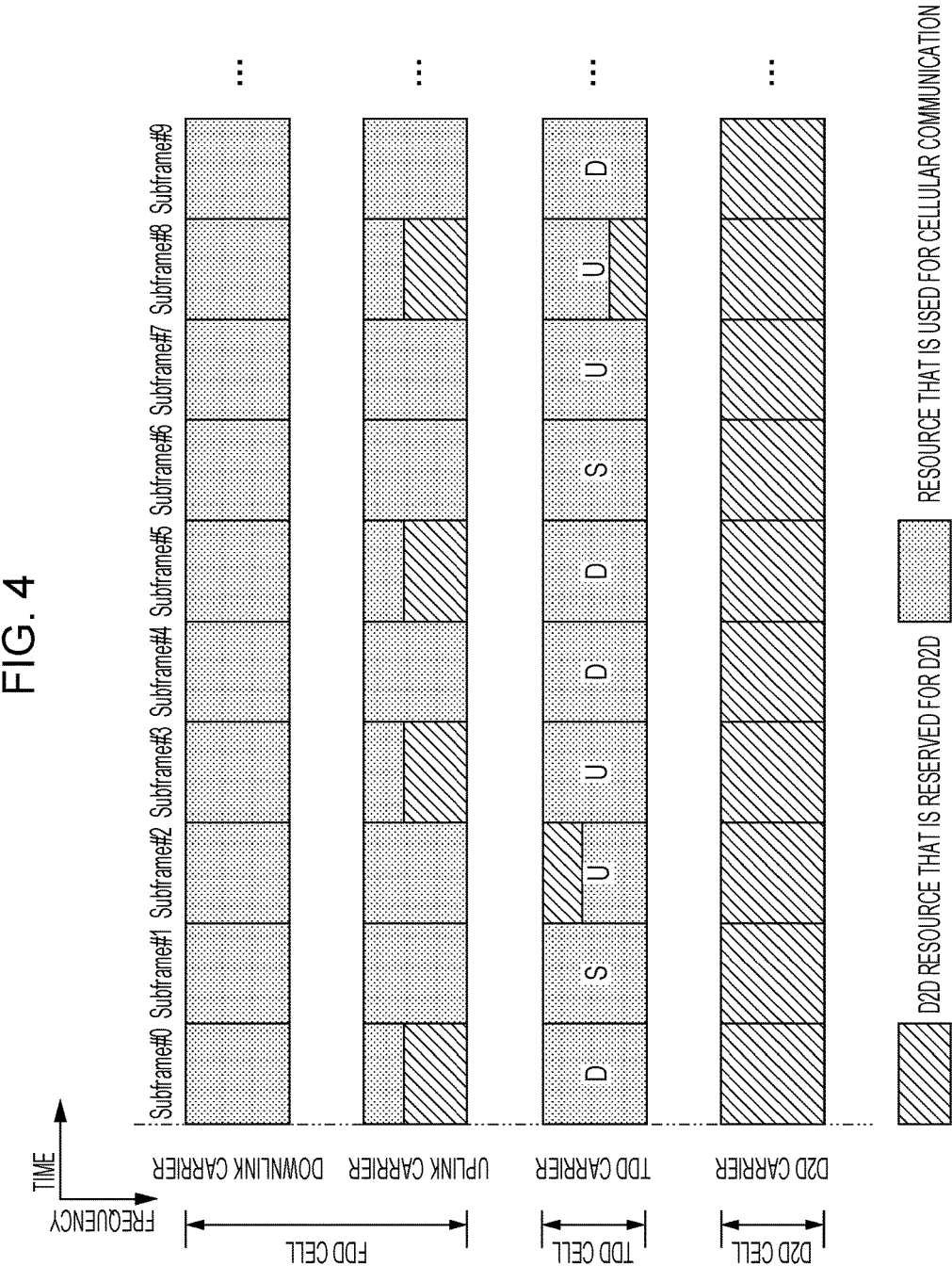
FIG. 4 is a diagram illustrating a D2D resource according to the present embodiment.

FIG. 4 is a diagram illustrating a D2D resource according to the present embodiment. In FIG. 4, the horizontal axis is a time axis and the vertical axis is a frequency axis. In FIG. 4, D indicates a downlink subframe, S indicates a special subframe, and U indicates an uplink subframe. One FDD cell corresponds to one downlink carrier, or one downlink carrier and one uplink carrier. One TDD cell corresponds to one TDD carrier. One D2D cell corresponds to one D2D carrier.

In the FDD cell, the downlink signal that is used for cellular communication is mapped to a subframe on the downlink carrier, the uplink signal that is used for the cellular communication is mapped to a subframe on the uplink carrier, and a D2D signal that is used for the D2D is mapped to a subframe on the uplink carrier. A carrier that corresponds to a cell in the downlink is referred to as a downlink component carrier. Furthermore, a carrier that corresponds to a cell in the uplink is referred to as an uplink component career.

In the TDD cell, the downlink signal that is used for the cellular communication is mapped to the downlink subframe and the DwPTS, the uplink signal that is used for the cellular communication is mapped to the uplink subframe and the UpPTS, and the D2D signal that is used for the D2D is mapped to the uplink subframe and the UpPTS.

The D2D cell is a cell dedicated to the D2D, and in the D2D cell, the D2D signal that is used for the D2D is mapped. That is, the D2D carrier to which the D2D cell corresponds is a carrier dedicated to the D2D. The D2D carrier is also referred to as a D2D-dedicated frequency band (D2D-dedicated spectrum), or a PS frequency band (Public Safety). The D2D resource in the D2D cell is also referred to as a D2D resource in the D2D-dedicated frequency band or a PS resource. In 3GPP, it has been considered that the D2D-dedicated frequency band is used for the PS. Moreover, the PS resource may be used for purposes other than the PS. Moreover, the D2D cell that is used for the PS may not be a serving cell.

Moreover, without establishing the cellular link, the terminal device 1 may establish the D2D link for the PS in the D2D-dedicated frequency band. In a case where, without establishing the cellular link, the D2D link is established for the PS in the D2D-dedicated frequency band, the terminal device 1 may establish the cellular link in advance, may configuration associated with the D2D for the PS, and may perform authentication on the D2D for the PS.

The base station apparatus 3 controls the D2D resource that is reserved for the D2D. The base station apparatus 3 reserves some of the resources on the uplink carrier in the FDD cell, as the D2D resource. The base station apparatus 3 reserves some of the resources in the uplink subframe and the UpPTS in the TDD cell, as the D2D resource. The base station apparatus 3 reserves all or some of the resources in the D2D cell, as the D2D resource.

The base station apparatus 3 transmits the higher layer signal that includes information indicating the D2D resource that is reserved in each of the cells, to the terminal device 1. The terminal device 1 sets a parameter, D2D-ResourceConfig, which indicates the D2D resource that is reserved for each of the cells, based on the higher layer signal that is received from the base station apparatus 3. That is, the base station apparatus 3 sets the parameter, D2D-ResourceConfig, which indicates the D2D resource that is reserved for each of the cells, for the terminal device 1 through the higher layer signal.

Moreover, one portion of the frequency band for the uplink carrier that corresponds to the FDD cell may be reserved as the D2D-dedicated frequency band. Furthermore, one portion of the frequency band for the uplink subframe that corresponds to the TDD cell may be reserved as the D2D-dedicated frequency band.

The base station apparatus 3 may notify the terminal device 1 whether or not each of the sets of D2D resources is a set of PS resources. Moreover, the terminal device 1 does not perform D2D transmission processing and D2D reception processing at the same time on one carrier.

Moreover, it is preferable that the D2D discovery/communication in the D2D resource which is used for purposes other than the PS is controlled or monitored by the base station apparatus 3.

A method of configuring a CP length according to the present embodiment is described.

It is preferable that the CP length is controlled in such a manner that a delay time of a delay wave converges to the CP length. The base station apparatus 3 controls CP lengths in the uplink and the downlink. Moreover, the base station apparatus 3 may individually control the CP lengths in the uplink and downlink for every serving cell.

Based on the PBCH for a serving cell, the terminal device 1 detects a CP length of the downlink signal for the serving cell, with the exception of the PMCH and the MBSFN RS. The extended CP is always applied to the PMCH and the MBSFN RS.

The base station apparatus 3 transmits to the terminal device 1 the higher layer signal that includes information indicating a CP length of the uplink signal. The terminal device 1 sets a parameter, UL-CyclicPrefixLength, which indicates the CP length in the uplink in the serving cell, based on the higher layer signal that is received from the base station apparatus 3. That is, the base station apparatus 3 sets the parameter, UL-CyclicPrefixLength, which indicates the CP length in the uplink in the serving cell, for the terminal device 1 through the higher layer signal. For example, in a case where, as illustrated in FIG. 1, the repeater 2 is used in the uplink, the extended CP may be applied in the uplink, considering a processing delay in the repeater 2.

A D2D communication path from a certain terminal device 1 to a different terminal device 1, and a D2D communication path from the different terminal device 1 to the terminal device 1 are the same. Therefore, it is preferable that, in the D2D, a CP length that is used for transmission from a certain terminal device 1 to a different terminal device 1, and a CP length that is used for transmission from the certain terminal device 1 to the different terminal device 1 are the same.

Because the D2D is for communication between the terminal devices 1 that are in proximity to each other, it is expected that the delay time of the delay wave is small. Therefore, a CP length in the D2D link may be a normal CP. That is, the CP length in the D2D link may be defied in advance with a specification or the like, and may be fixed.

However, there is a likelihood that a synchronization method in the D2D will not be sufficiently considered and thus that synchronization between the terminal devices 1 will not be precise. Therefore, the CP length in the D2D link may be an extended CP.

Furthermore, based on the synchronization method in the D2D, or on a wireless state between the terminal devices 1, a geographical distance between the terminal devices 1, uplink transmission timing for the cellular communication in each of the terminal devices 1, and/or the like, the terminal device 1 or the base station apparatus 3 may control the CP length in the D2D link. That is, the CP length in the D2D, the CP length in the downlink, and the CP length in the uplink may be individually controlled. That is, a CP length of each of the D2D signal and the uplink signal that are transmitted on the same carrier may be individually configured.

For example, the base station apparatus 3 may transmit to the terminal device 1 the higher layer signal that includes information indicating the CP length in the D2D. The terminal device 1 may set a parameter, D2D-CyclicPrefix-Length, which indicates the CP length in the D2D, based on the higher layer signal that is received from the base station apparatus 3. That is, the base station apparatus 3 may set a parameter, D2D-CyclicPrefixLength, which indicates the CP length in the D2D, for the terminal device 1 through the higher layer signal.

Moreover, the CP length of the D2D signal for the D2D discovery may be different from the CP length for the D2D communication. The base station apparatus 3 may transmit to the terminal device 1 the higher layer signal that includes information indicating the CP length for the D2D discovery. The base station apparatus 3 may transmit to the terminal device 1 the higher layer signal that includes information indicating the CP length for the D2D communication.

Moreover, the CP length for the D2D discovery and/or the D2D communication may be 0.

Figure 5:
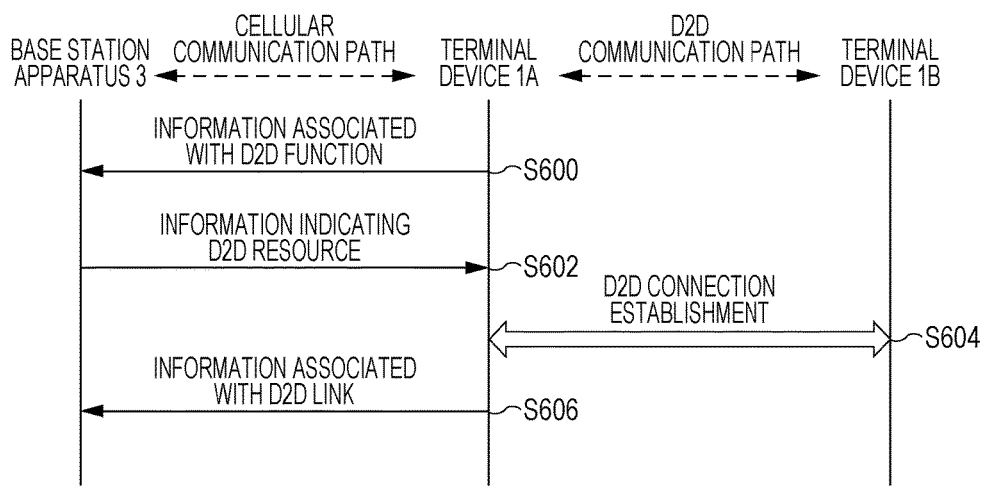
FIG. 5 is a diagram illustrating information associated with D2D, which is transferred over a cellular link according to the present embodiment.
Figure 6:
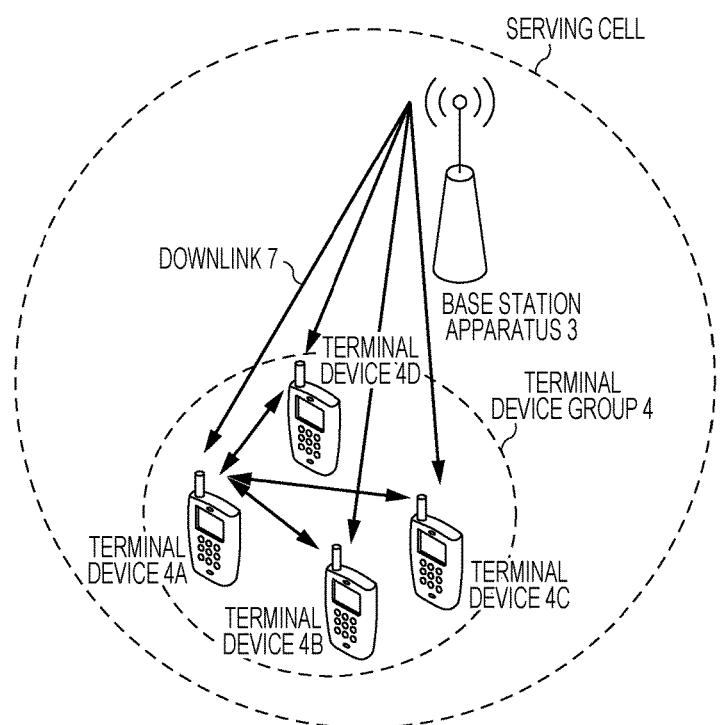
FIG. 6 is a conceptual diagram of transmission and reception of a D2D signal within coverage by a base station according to the present embodiment.

FIG. 5 is a diagram illustrating information associated with the D2D, which is transferred over the cellular link according to the present embodiment. In FIG. 6, the cellular communication path between the base station apparatus 3 and the terminal device 1A is established. In FIG. 6, the D2D communication path between the terminal device 1A and the terminal device 1B is established.

The base station apparatus 3 and the terminal device 1A performs transmission and reception processing of information associated with the D2D, in order for the base station apparatus 3 to perform control of and/or monitoring of the D2D communication path and/or the ProSe-assisted WLAN direct communication path.

The terminal device 1A transmits information associated with a D2D function to the base station apparatus 3 (S600). Based on the received information associated with the D2D function, the base station apparatus 3 transmits information indicating a D2D link configuration to the terminal device 1A (S602). Based on the received information indicating the D2D link configuration, the terminal device 1A establishes a D2D connection (S604). The terminal device 1A transmits information associated with the established D2D link (connection) to the base station apparatus 3 (S606).

Moreover, in S604, the terminal device 1A may transmit/transfer the information indicating the D2D link configuration to the terminal device 1B.

In FIG. 6, the terminal device 1B may establish the cellular communication path to a different base station apparatus 3. The terminal device 1B may transmit information associated with the D2D link to a different base station apparatus 3. Multiple base station apparatuses 3 may transmit/transfer the information associated with the D2D link through backhall that is established between each of the base station apparatuses 3.

In FIG. 6, the terminal device 1B may establish the cellular communication path to the base station apparatus 3. The terminal device 1B may transmit the information associated with the D2D link to the base station apparatus 3.

In FIG. 6, only the terminal device 1 (for example, one terminal device 1), which belongs to a group of terminal devices 1 that perform the D2D, may transmit the information associated with the D2D link to EUTRAN (the base station apparatus 3). Moreover, the terminal device 1 that belongs to the group may be determined between the terminal devices 1 that perform the D2D. Furthermore, the terminal device 1 that belongs to the group may be designated by the base station apparatus 3. Furthermore, the base station apparatus 3 may set whether or not the information associated with the D2D link is reported, through the higher layer signal, for each of the terminal devices 1.

Accordingly, using an uplink resource, the information associated with the D2D link can avoid being redundantly transmitted to EUTRAN, and utilization efficiency of the uplink resource can be improved.

The base station apparatus 3 may transmit the information indicating the D2D link configuration for each of the sets of D2D resources, to the terminal device 1. Multiple sets of D2D resources may be set for one terminal device 1. One set of D2D resources may include one cell. Multiple sets of D2D resources may be set for one cell. One set of D2D resources may be set for every D2D communication path. Multiple D2D communication paths may be established for one terminal device 1.

Some or all of pieces of information (H1) to (H15) may be included in the information indicating the D2D link configuration. The pieces of information (H1) to (H15) may be transmitted at different timings, respectively.

Information (H1): information indicating a cell in which the D2D resource is included Information (H2): information indicating a subframe in which the D2D resource is included Information (H3): information indicating a frequency bandwidth and/or a frequency position of the D2D resource within a subframe Information (H4): information indicating the virtual resource block or the physical resource block that constitutes the D2D resource within a subframe Information (H5): information indicating a cell in which the PS resource is included Information (H6): information indicating a subframe in which the PS resource is included Information (H7): information indicating a frequency bandwidth and/or a frequency position of the PS resource within a subframe Information (H8): information a virtual resource block or a physical resource block that constitutes the PS resource within a subframe Information (H9): information indicating that hopping of a resource for the D2D signal (for example, the PUSCH) is enabled or has to be implemented Information (H10): information indicating a hopping mode for a resource for the D2D signal Information (H11): information indicating that hopping of the D2D resource is enabled or has to be implemented Information (H12): Information indicating the hopping mode for the D2D resource Information (H13): Information indicating a configuration of the D2D signal associated with the D2D discovery Information (H14): Information indicating the configuration of the D2D signal associated with the D2D communication Information (H15): Information indicating a configuration of the ProSe-assisted WLAN direct communication The information (H2) may indicate a periodicity and offset for a number of a subframe for which the D2D resource is reserved. The information (H2) may be expressed by a bitmap. Each bit in the bitmap may correspond to one subframe.

As the hopping mode for the D2D signal, there are an inter-subframe mode and an intra- and inter-subframe mode. In the inter-subframe mode, for every subframe, hopping is implemented on the resource for the D2D signal. In the intra- and inter-subframe mode, for every slot, the hopping is implemented on the resource for the D2D signal.

Information relating to the D2D link may include pieces of information (I1) to information (I42). The pieces of information (I1) to (I42) may be transmitted at different timings, respectively.

Information (I1): information indicating a subset of D2D resources that are used for the D2D discovery and/or the D2D communication Information (I2): information indicating the subset of D2D resources on which the D2D transmission processing is performed Information (I3): information indicating the subset of D2D resources on which D2D signal reception processing/monitoring is performed Information (I4): information indicating a band that is used for the D2D discovery and/or the D2D communication Information (I5): information indicating a band on which the D2D signal transmission processing is performed Information (I6): information indicating a band on which the D2D signal reception processing/monitoring is performed Information (I7): information indicating a cell that is used for the D2D discovery and/or the D2D communication Information (I8): information indicating a cell on which the D2D signal transmission processing is performed Information (I9): information indicating a cell on which the D2D signal reception processing/monitoring is performed Information (I10): information indicating a subframe that is used for the D2D discovery and/or the D2D communication Information (I11): information indicating a subframe on which the D2D signal transmission processing is performed Information (I12): information indicating a subframe on which the D2D signal reception processing/monitoring is performed Information (I13): information indicating the CP length of the D2D signal Information (I14): information indicating whether or not the D2D is performed in the D2D-dedicated frequency band Information (I15): information indicating that the D2D is started in the D2D-dedicated frequency band Information (I16): information indicating that the D2D is completed in the D2D-dedicaTED frequency band Information (I17): information indicating whether or not the D2D for the PS is performed Information (I18): information indicating that the D2D for the PS is started Information (I19): information indicating that the D2D for the PS is completed Information (I20): information indicating whether or not WLAN communication is performed Information (I21): information indicating that the WLAN communication is started Information (I22): information indicating that the WLAN communication is completed Information (I23): information indicating WLAN specifications that are used for the WLAN communication Information (I24): information indicating whether or not the ProSe-assisted WLAN direct communication is performed Information (I25): information indicating that the ProSe-assisted WLAN direct communication is started Information (I26): information indicating that the ProSe-assisted WLAN direct communication is completed Information (I27): information indicating the WLAN specifications that are used for the ProSe-assisted WLAN direct communication Information (I28): information indicating a channel situation (measured interference) in the D2D communication path and/or the ProSe-assisted WLAN direct communication path Information (I29): information indicating Quality of Service (QoS) of the D2D communication path and/or the ProSe-assisted WLAN direct communication path Information (I30): information indicating an amount of traffic that is transmitted and received along the D2D communication path and/or the ProSe-assisted WLAN direct communication path Information (I31): information indicating an amount of traffic that is transmitted along the D2D communication path and/or the ProSe-assisted WLAN direct communication path Information (I32): information indicating an amount of traffic that is received along the D2D communication path and/or the ProSe-assisted WLAN direct communication path Information (I33): information (Buffer Status Report (BSR)) indicating an amount of traffic (data or packets) in a state of waiting to be transmitted along the D2D communication path and/or the ProSe-assisted WLAN direct communication path Information (I34): information indicating a communication range for the D2D communication path and/or the ProSe-assisted WLAN direct communication path Information (I35): information indicating the priority of a packet along the D2D communication path and/or the ProSe-assisted WLAN direct communication path Information (I36): information indicating an averaged bit rate for the D2D communication path and/or the ProSe-assisted WLAN direct communication path Information (I37): information indicating an averaged packet delay along the D2D communication path and/or the ProSe-assisted WLAN direct communication path Information (I38): information indicating an averaged packet loss rate (Block Error Rate (BLER)) for the D2D communication path and/or the ProSe-assisted WLAN direct communication path Information (I39): information indicating whether or not the QoS of the D2D communication path and/or the ProSe-assisted WLAN direct communication path satisfies QoS to which an QoS Class Identifier (QCI) for the D2D communication path and/or the ProSe-assisted WLAN direct communication path corresponds Information (I40): information indicating an identifier (identity) of the terminal device 1 that performs the D2D communication path and/or ProSe-assisted WLAN direct communication path Information (I41): information indicating a Public Land Mobile Network (PLMN)/operator to which the terminal device 1 that performs the D2D communication path and/or the ProSe-assisted WLAN direct communication path has a connection Information (I42): information indicating the geographical location of the terminal device 1

The terminal device 1 may transmit the information relating to the D2D link for each of the sets of D2D resources, each of the D2D communication paths, each of the ProSe-assisted WLAN direct communication paths, and/or each of the applications, to the base station apparatus 3.

Reporting of the information relating to the D2D link may be triggered in a case where any state in the pieces of information (I1) to (I42) is changed. Furthermore, the reporting of the information relating to the D2D link may be triggered in a case where any value in the pieces of information (I1) to (I42) is changed to a threshold or above. Furthermore, the reporting of the information relating to the D2D link may be triggered in a case where a difference between any value in the pieces of information (I1) to (I42) as of the time of the last reporting of the information relating to the D2D link and a current value is equal to or greater than the threshold. In this case, among the pieces of information (I1) to (I42), only information that corresponds to the triggering may be reported. The reporting of the information relating to the D2D link may be triggered based on an instruction from the base station apparatus 3.

For example, in a case where the amount of traffic that is transferred over the D2D transfer path exceeds the threshold, the reporting of the information relating to the D2D link may be triggered. For example, in a case where the QoS of the D2D communication path and/or the ProSe-assisted WLAN direct communication path does not satisfy the QoS to which the QoS Class Identifier (QCI) for the D2D communication path and/or the ProSe-assisted WLAN direct communication path corresponds, the reporting of the information relating to the D2D link may be triggered.

In a case where the reporting of the information relating to the D2D link is triggered at least one time, the PUSCH for initial transmission on the uplink, and as a result of logical channel prioritization procedure, the information relating to the D2D link can be accommodated in the PUSCH, the terminal device 1 may report the information relating to the D2D link using the PUSCH.

The QCI is defined by the priority of a packet, an allowable packet delay time (packet delay budget), an allowable packet loss rate (packet error loss rate), the presence or absence of the guarantee of a transfer speed (bit rate), and the like. The QCI is a scalar that is used as a reference against which a specific packet transfer operation is checked. The base station apparatus 3 may transmit information relating to the QCI that corresponds to the D2D communication path, to the terminal device 1.

The geographical location of the terminal device 1 may be measured based on a PRS and/or a Global Navigation Satellite System (GNSS).

For example, the terminal device 1 may determine a subset of D2D resources that are used for transmission and reception of the D2D signal, among the D2D resources that are indicated with the information indicating the D2D link configuration, and may transmit the information (I1) indicating the determined offset of D2D resources to the base station apparatus 3.

Next, a method of transmitting and receiving the D2D signal is described.

FIG. 6 illustrates an example in which the D2D communication is performed between groups (between terminal devices) each of which is constituted from multiple terminal devices within coverage by a base station. As illustrated, four stations, terminal devices 4A to 4D, belong to a terminal device group 4. For example, the terminal device 4A may transmit the D2D signal to the terminal device group 4 (the terminal devices 4B to 4D). Furthermore, each of the terminal devices 4B to 4D may receive the D2D signal.

The base station apparatus 3 allocates the same RNTI (which is hereinafter also referred to as a D2D-RNTI) to each of the terminal devices 4A to 4D that belong to the terminal device group 4. For example, the base station apparatus 3 may configure the D2D-RNTI having the same value, for each of the terminal devices 4A to 4D, using the higher layer signal (for example an RRC layer signal).

Furthermore, the base station apparatus 3 transmits a radio resource (information relating to resource allocation) that is used for the transmission and the reception of the D2D signal, and information (at this point, information relating to the terminal device 4A) relating to a transmission terminal, to each of the terminal devices 4A to 4D, in a state of being included in the same Downlink Control Information (DCI). For example, with the Physical Downlink Control Channel, the base station apparatus 3 may transmit the information relating to the resource allocation and the Downlink Control Information in which the information relating to the transmission terminal is included.

At this time, a CRC bit that is attached in a case where the DCI is generated is masked (scrambled), with the RNTI described above, by exclusive OR. Accordingly, it is possible that only the terminal devices 4A to 4D transmit and receive the D2D signal. That is, each of the terminal devices 4A to 4D monitor the Downlink Control Information to which the CRC parity bit that is scrambled by the D2D-RNTI is attached.

Each of the terminal devices 4A to 4D receives (detects) the Downlink Control Information that is transmitted from the base station apparatus. At this time, based on the information relating to the transmission terminal, the terminal device 4A may determine that the terminal device 4A itself is a transmission terminal. That is, in a case where, based on the information relating to the transmission terminal, the terminal device 4A is instructed to be a transmission terminal, the terminal device 4A may recognize that the terminal device 4A itself is a transmission terminal in the terminal device group 4. Then, based on the information relating to the resource allocation, the terminal device 4A may transmit the D2D signal. That is, the terminal device 4 that, based on the information relating to the transmission terminal, is instructed to be a transmission terminal may transmit the D2D signal using the radio resource that is indicated with the information relating to the resource allocation.

On the other hand, based on the information relating to the transmission terminal, each of the terminal devices 4B to 4D determines that each of the terminal devices 4B to 4D is itself not a transmission terminal. That is, in a case where, based on the information relating to the transmission terminal, the terminal device 4A is instructed not to be a transmission terminal (in a case where the terminal device 4A is instructed to be a reception terminal), the terminal device 4A may recognize that the terminal device 4A itself is not a transmission terminal in the terminal device group 4 (may recognize that the terminal device 4A itself is a reception terminal). Then, based on the information relating to the resource allocation, each of the terminal devices 4B to 4D may receive the D2D signal. That is, each of the terminal devices 4B to 4D that, based on the information relating to the transmission terminal, is itself instructed to be a reception terminal may receive the D2D signal using the radio resource that is indicated with the information relating to the resource allocation.

That is, the information relating to the transmission terminal may be information for indicating the terminal device that transmits the D2D signal, in a certain group of terminal devices. Furthermore, the information relating to the transmission terminal may be information for indicating the terminal device that receives the D2D signal, in a certain group of terminal devices. That is, the terminal device that transmits the D2D signal and/or the terminal device that receives the D2D signal may be indicated based on a value to which one field that is included in the Downlink Control Information (the DCI format) is set.

Furthermore, the information relating to the transmission terminal may be information for recognizing a resource that is indicated based on the information relating to the resource allocation, as a radio resource for transmission of the D2D signal. Furthermore, the information relating to the transmission terminal may be information for recognizing a radio resource that is indicated based on the information relating to the resource allocation, as a resource for reception of the D2D signal. That is, information relating to the resource allocation that is included in the Downlink Control Information (a value to which a field for the information relating to the resource allocation is set), when interpreted, is switched to information (a value) for indicating the radio resource for the transmission of the D2D signal and/or the radio resource for the transmission of the D2D signal, based on the information relating to the transmission terminal.

At this point, the base station apparatus 3 may configure an identifier (ID) of the transmission device for each of the terminal devices 4A to 4D, using the higher layer signal. Furthermore, the ID of the transmission may be pre-configured for each of the terminal devices 4A to 4D. Furthermore, each of the terminal devices 4A to 4D may select the ID of the transmission device.

At this point, the information relating to the transmission terminal may indicate a value that corresponds to the ID of the transmission device (may be set to a value that corresponds to the ID of the transmission device). Furthermore, the ID of the transmission device may be used for identifying the terminal device (for example, each of the terminal devices 4A to 4D) in a certain group of terminal devices. That is, based on whether or not a field for the information relating to the transmission terminal is set to the value that corresponds to the configured ID of the transmission device, each of the terminal devices 4A to 4D may identify that each of the terminal devices 4A to 4D is itself a transmission terminal, or that each of the terminal devices 4A to 4D is itself a reception terminal.

At this point, in the description so far, as one example, the terminal devices 4A is a transmission terminal and each of the terminal devices 4B to 4D is a reception device, but, based on the same method, all of the terminal devices 4A to 4D can, of course, be transmission terminals or reception terminals.

In this case, a notification may be provided as the information indicating the D2D resource as described in the information (I1) or (I2), or a resource (Exact Resource) that is used for actual communication which is included within an uplink channel that is reserved as illustrated in FIG. 4. Furthermore, a resource that is used for direct communication may be notified without reserving the D2D resource in advance with a higher layer.

Furthermore, it is desirable that a Downlink Control Channel on which the CRC is scrambled with the D2D-RNTI is designed in such a manner as to have the same payload length as that of the DCI format that is currently present, but even if the Downlink Control Channel has a different payload length from that of the DCI format, the present invention is realized.

A constitution of the device according to the present embodiment will be described below.

Figure 7:
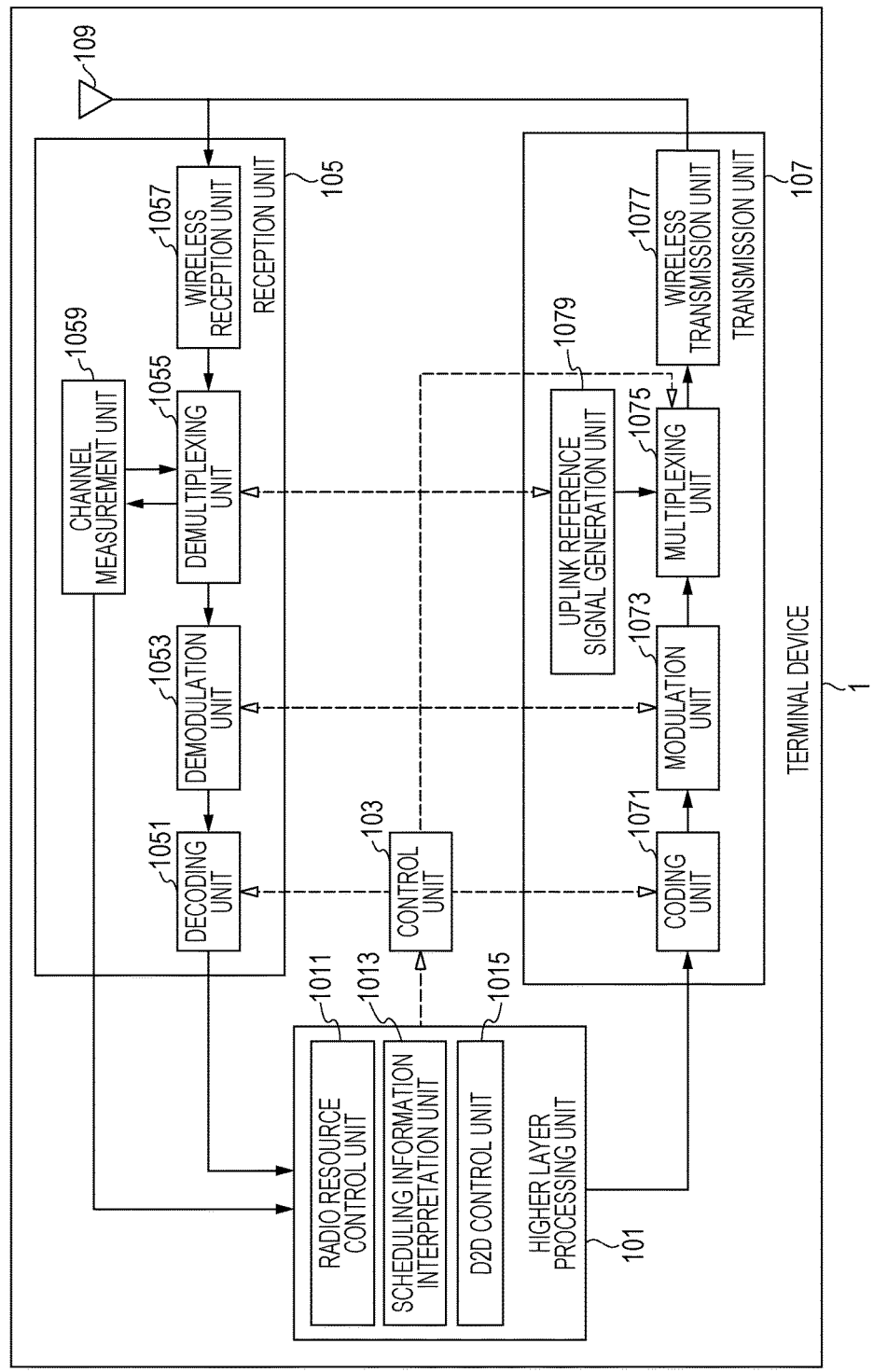
FIG. 7 is a schematic block diagram illustrating a constitution of a terminal device 1 according to the present embodiment.

FIG. 7 is a schematic block diagram illustrating a constitution of the terminal device 1 according to the present embodiment. As illustrated, the terminal device 1 is constituted to include a higher layer processing unit 101, a control unit 103, a reception unit 105, a transmission unit 107, and a transmit and receive antenna unit 109. Furthermore, the higher layer processing unit 101 is constituted to include a radio resource control unit 1011, a scheduling information interpretation unit 1013, and a D2D control unit 1015. Furthermore, the reception unit 105 is constituted to include a decoding unit 1051, a demodulation unit 1053, a demultiplexing unit 1055, a wireless reception unit 1057, and a channel measurement unit 1059. Furthermore, the transmission unit 107 is constituted to include a coding unit 1071, a modulation unit 1073, a multiplexing unit 1075, a wireless transmission unit 1077, and an uplink reference signal generation unit 1079.

The higher layer processing unit 101 outputs the uplink data (the transport block) that is generated by a user operation and the like, to the transmission unit 107. Furthermore, the higher layer processing unit 101 performs processing of a Medium Access Control (MAC) layer, a Packet Data Convergence Protocol (PDCP) layer, a Radio Link Control (RLC) layer, and a Radio Resource Control (RRC) layer.

The radio resource control unit 1011 that is included in the higher layer processing unit 101 manages various pieces of configuration information of the terminal device 1 itself or various parameters for the terminal device 1 itself. The radio resource control unit 1011 sets various pieces of configuration information/parameters based on the higher layer signal that is received from the base station apparatus 3. That is, the radio resource control unit 1011 sets various pieces of configuration information/parameters based on pieces of information indicating various pieces of configuration information/parameters that are received from the base station apparatus 3. Furthermore, the radio resource control unit 1011 generates information that is mapped to each uplink channel in the uplink and outputs the generated information to the transmission unit 107.

The scheduling information interpretation unit 1013 that is included in the higher layer processing unit 101 interprets the DCI format (scheduling information) that is received through the reception unit 105, generates control information for performing control of the reception unit 105 and the transmission unit 107 based on a result of interpreting the DCI format, and outputs the generated control information to the control unit 103.

The D2D control unit 1015 that is included in the higher layer processing unit 101 performs control of the D2D discovery, the D2D communication, and/or the ProSe-assisted WLAN direct communication, based on various pieces of configuration information/parameters that are managed by the radio resource control unit 1011. The D2D control unit 1015 may generate the information relating to the D2D, which is transmitted to a different terminal device 1 or EUTRAN (the base station apparatus 3).

The control unit 103 generates a control signal for performing the control of the reception unit 105 and the transmission unit 107, based on the control information from the higher layer processing unit 101. The control unit 103 outputs the generated control signal to the reception unit 105 and the transmission unit 107 and performs the control of the reception unit 105 and the transmission unit 107.

In accordance with the control signal that is input from the control unit 103, the reception unit 105 demultiplexes, demodulates, and decodes a reception signal that is received from the base station apparatus 3 through the transmit and receive antenna unit 109, and outputs the resulting information to the higher layer processing unit 101.

The wireless reception unit 1057 converts (down-converts) a downlink signal that is received through the transmit and receive antenna unit 109 into a signal in a baseband by performing orthogonal demodulation, removes a unnecessary frequency component, controls an amplification level in such a manner that a signal level is suitably maintained, performs orthogonal demodulation based on an in-phase component and an orthogonal component of the received signal, and converts the analog signal that results from the orthogonal demodulation, into a digital signal. The wireless reception unit 1057 removes a portion that is equivalent to a Cyclic Prefix (CP) from the digital signal that results from the conversion, performs Fast Fourier Transform (FFT) on the signal from which the CP is removed, and extracts a signal in the frequency domain.

The demultiplexing unit 1055 demultiplexes the extracted signal that result from the extraction, into the PHICH, the PDCCH, the EPDCCH, the PDSCH, and the Downlink Reference Signal. Furthermore, the demultiplexing unit 1055 performs compensation on channels, that is, the PHICH, the PDCCH, the EPDCCH, and the PDSCH, using a channel estimation value that is input from the channel measurement unit 1059. Furthermore, the demultiplexing unit 1055 outputs the Downlink Reference Signal that results from the demultiplexing to the channel measurement unit 1059.

The demodulation unit 1053 multiplies the PHICH by a corresponding code for composition, performs demodulation in compliance with a Binary Phase Shift Keying (BPSK) modulation scheme on the resulting composite signal, and outputs a result of the demodulation to the decoding unit 1051. The decoding unit 1051 decodes the PHICH that is destined for the terminal device 1 itself, and outputs the HARQ indicator that results from the decoding to the higher layer processing unit 101. The demodulation unit 1053 performs demodulation in compliance with a QPSK modulation scheme on the PDCCH and/or the EPDCCH, and outputs a result of the demodulation to the decoding unit 1051. The decoding unit 1051 makes an attempt to perform the decoding of the PDCCH and/or the EPDCCH. In a case where the decoding unit 1051 succeeds in the decoding, the decoding unit 1051 outputs Downlink Control Information that results from the decoding and an RNTI to which the Downlink Control Information corresponds, to the higher layer processing unit 101.

The demodulation unit 1053 performs the demodulation on the PDSCH in compliance with the modulation scheme that is notified with the downlink grant, such as Quadrature Phase Shift keying (QPSK), 16 Quadrature Amplitude Modulation (QAM), or 64 QAM, and outputs a result of the demodulation to the decoding unit 1051. The decoding unit 1051 performs decoding based on information relating to a coding rate that is notified with the Downlink Control Information, and outputs downlink data (a transport block) that results from the decoding, to the higher layer processing unit 101.

The channel measurement unit 1059 measures a downlink path loss or a channel state from the Downlink Reference Signal that is input from the demultiplexing unit 1055, and outputs the measured path loss or channel state to the higher layer processing unit 101. Furthermore, the channel measurement unit 1059 calculates a downlink channel estimation value from the Downlink Reference Signal and outputs the calculated downlink channel estimation value to the demultiplexing unit 1055. The channel measurement unit 1059 performs channel measurement and/or interference measurement in order to calculate a CQI.

The transmission unit 107 generates the Uplink Reference Signal in accordance with the control signal, which is input from the control unit 103, performs the coding and the modulation on the uplink data (the transport block), which is input from the higher layer processing unit 101, multiplexes the PUCCH, the PUSCH, and the generated Uplink Reference Signal, and transmits a result of the multiplexing to the base station apparatus 3 through the transmit and receive antenna unit 109.

The coding unit 1071 performs the coding, such as convolutional coding and block coding, on the Uplink Control Information that is input from the higher layer processing unit 101. Furthermore, the coding unit 1071 performs turbo coding, based on information that is used for scheduling the PUSCH.

The modulation unit 1073 performs the modulation on coded bits, which are input from the coding unit 1071, in compliance with the modulation scheme that is notified with the Downlink Control Information, such as BPSK, QPSK, 16 QAM, or 64 QAM, or in compliance with a modulation scheme that is prescribed in advance for every channel. Based on the information that is used for the scheduling the PUSCH, the modulation unit 1073 determines the number of sequences of pieces of data that are spatially multiplexed, maps multiple pieces of uplink data that are transmitted on the same PUSCH, to multiple sequences, by using Multiple Input Multiple Output (MIMO) Spatial Multiplexing (SM), and performs precoding on the sequences.

The uplink reference signal generation unit 1079 generates a sequence that is acquired according to a rule (an equation) that is prescribed in advance, based on a physical layer cell identifier (which is also referred to as a physical layer cell identity (PCI), a Cell ID, or the like) for identifying the base station apparatus 3, a bandwidth to which the Uplink Reference Signal is mapped, a cyclic shift that is notified with the uplink grant, a value of a parameter for generation of a DMRS sequence, and the like. In accordance with the control signal that is input from the control unit 103, the multiplexing unit 1075 rearranges modulation symbols of the PUSCH in parallel and then performs Discrete Fourier Transform (DFT) on the resulting modulation symbols. Furthermore, the multiplexing unit 1075 multiplexes PUCCH and PUSCH signals and the generated Uplink Reference Signal for every transmit antenna port. More precisely, the multiplexing unit 1075 maps the PUCCH and PUSCH signals and the generated Uplink Reference Signal to the resource elements for every transmit antenna port.

The wireless transmission unit 1077 performs Inverse Fast Fourier Transform (IFFT) on a signal that results from the multiplexing, generates an SC-FDMA symbol, attaches a CP to the generated SC-FDMA symbol, generates a digital signal in a baseband, converts the digital signal in the baseband into an analog signal, removes a superfluous frequency component using a low pass filter, performs up-converting into a carrier frequency, performs power amplification, and outputs a final result to the transmit and receive antenna unit 109 for transmission.

Figure 8:
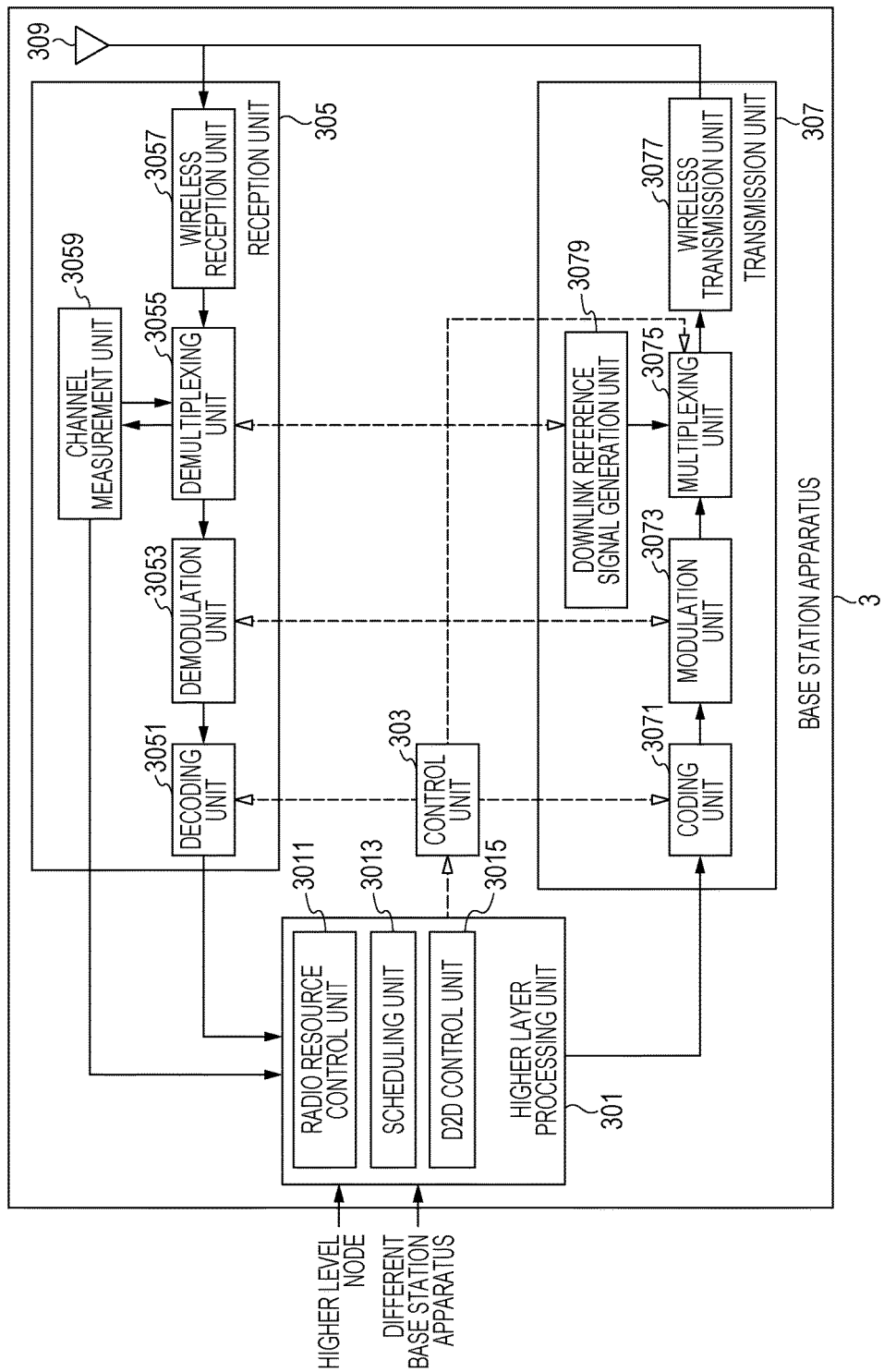
FIG. 8 is a schematic block diagram illustrating a constitution of a base station apparatus 3 according to the present embodiment.

FIG. 8 is a schematic block diagram illustrating a constitution of the base station apparatus 3 according to the present embodiment. As illustrated, the base station apparatus 3 is constituted to include a higher layer processing unit 301, a control unit 303, a reception unit 305, a transmission unit 307, and a transmit and receive antenna unit 309. Furthermore, the higher layer processing unit 301 is constituted to include a radio resource control unit 3011, a scheduling unit 3013, and a D2D control unit 3015. Furthermore, the reception unit 305 is constituted to include a decoding unit 3051, a demodulation unit 3053, a demultiplexing unit 3055, a wireless reception unit 3057, and a channel measurement unit 3059. Furthermore, the transmission unit 307 is constituted to include a coding unit 3071, a modulation unit 3073, a multiplexing unit 3075, a wireless transmission unit 3077, and a downlink reference signal generation unit 3079.

The higher layer processing unit 301 performs the processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 301 generates a control signal in order to perform control of the reception unit 305 and the transmission unit 307, and outputs the generated control information to the control unit 303.

The radio resource control unit 3011 that is included in the higher layer processing unit 301 generates, or acquires from a higher level node, the downlink data (the transport block) that is mapped to the PDSCH in the downlink, system information, a RRC message, an MAC Control Element (CE), and the like, and outputs a result of the generation or of the acquirement to the transmission unit 307. Furthermore, the radio resource control unit 3011 manages various pieces of configuration information of each of the terminal devices 1 or various parameters for each of the terminal devices 1. The radio resource control unit 1011 may set various pieces of configuration information/parameters for each of the terminal devices 1 through the higher layer signal. That is, the radio resource control unit 1011 transmits/broadcasts pieces of information indicating various pieces of configuration information/parameters.

The scheduling unit 3013 that is included in the higher layer processing unit 301 determines a frequency and a subframe to which the physical channel (the PDSCH and the PUSCH) is allocated, the coding rate and the modulation scheme for the physical channel (the PDSCH and the PUSCH), transmission power, and the like, from the received Channel State Information and from the channel estimation value, the channel quality, or the like that is input from the channel measurement unit 3059. The scheduling unit 3013 generates the control information (for example, the DCI format) in order to perform the control of the reception unit 305 and the transmission unit 307 based on a result of the scheduling, and outputs the generated information to the control unit 303. Additionally, the scheduling unit 3013 determines a timing when the transmission processing and reception processing are performed.

The D2D control unit 3015 that is included in the higher layer processing unit 301 performs control of the D2D discovery, the D2D communication, and/or the ProSe-assisted WLAN directs communication in the terminal device 1 that performs the communication using the cell link, based on various pieces of configuration information/parameters that are managed by the radio resource control unit 3011. The D2D control unit 3015 may generate the information relating to the D2D, which is transmitted to a different base station apparatus 3 or the terminal device 1.

The control unit 303 generates the control signal for performing the control of the reception unit 305 and the transmission unit 307, based on control information from the higher layer processing unit 301. The control unit 303 outputs the generated control signal to the reception unit 305 and the transmission unit 307 and performs the control of the reception unit 305 and the transmission unit 307.

In accordance with the control signal that is input from the control unit 303, the reception unit 305 demultiplexes, demodulates, and decodes a reception signal that is received from the terminal device 1 through the transmit and receive antenna unit 309, and outputs the resulting information to the higher layer processing unit 301. The wireless reception unit 3057 converts (down-converts) an uplink signal that is received through the transmit and receive antenna unit 309 into a signal in a baseband by performing the orthogonal demodulation, removes an unnecessary frequency component, controls an amplification level in such a manner that a signal level is suitably maintained, performs the orthogonal demodulation based on an in-phase component and an orthogonal component of the received signal, and converts the analog signal that results from the orthogonal demodulation, into a digital signal.

The wireless reception unit 3057 removes a portion that is equivalent to a Cyclic Prefix (CP) from a digital signal that results from the conversion. The wireless reception unit 3057 performs the Fast Fourier Transform (FFT) on the signal from which the CP is removed, extracts a signal in the frequency domain, and outputs the extracted signal to the demultiplexing unit 3055.

The demultiplexing unit 1055 demultiplexes the signal that is input from the wireless reception unit 3057, into the PUCCH, the PUSCH, the Uplink Reference Signal, and the like. Moreover, the demultiplexing is performed based on radio resource allocation information that is determined in advance by the base station apparatus 3, using the radio resource control unit 3011, and that is included in the uplink grant that is notified to each of the terminal devices 1. Furthermore, the demultiplexing unit 3055 performs the configuration on the channels, that is, the PUCCH and the PUSCH, using the channel estimation value that is input from the channel measurement unit 3059. Furthermore, the demultiplexing unit 3055 outputs an Uplink Reference Signal that results from the demultiplexing, to the channel measurement unit 3059.

The demodulation unit 3053 performs Inverse Discrete Fourier Transform (IDFT) on the PUSCH, acquires the modulation symbol, and performs reception signal demodulation on each of the modulation symbols of the PUCCH and the PUSCH, using the modulation scheme that is prescribed in advance, such as Binary Phase Shift Keying (BPSK), QPSK, 16 QAM, or 64 QAM, or using the modulation scheme that is notified, in advance with the uplink grant, to each of the terminal devices 1 by the base station apparatus 3 itself. The demodulation unit 3053 demultiplexes the modulation symbols of the multiple pieces of uplink data that are transmitted on the same PUSCH by using the MIMO SM, based on the number of spatially multiplexed sequences that is notified in advance with the uplink grant to each of the terminal devices 1 and on information indicating the precoding that is performed on the sequences.

The decoding unit 3051 performs the decoding on coded bits of the PUCCH and the PUSCH that result from the demodulation, at a coding rate in compliance with the coding scheme that is prescribed in advance, which is prescribed in advance, or at a coding rate which is notified in advance with the uplink grant to the terminal device 1 by the base station apparatus 3 itself, and outputs uplink data and uplink control information that result from the decoding, to the higher layer processing unit 101. In a case where the PUSCH is re-transmitted, the decoding unit 3051 performs the decoding using the coded bits that are input from the higher layer processing unit 301 and that are retained in an HARQ buffer, and the coded bits that result from the demodulation. The channel measurement unit 309 measures the channel estimation value, the channel quality, and the like, from the Uplink Reference Signal that is input from the demultiplexing unit 3055, and outputs a result of the measurement to the demultiplexing unit 3055 and the higher layer processing unit 301.

The transmission unit 307 generates the Downlink Reference Signal in accordance with the control signal that is input from the control unit 303, codes and modulates the HARQ indicator, the Downlink Control Information, and the downlink data that are input from the higher layer processing unit 301, multiplexes the PHICH, the PDCCH, the EPDCCH, the PDSCH, and the Downlink Reference Signal, and transmits the resulting signal to the terminal device 1 through the transmit and receive antenna unit 309.

The coding unit 3071 performs the coding on the HARQ indicator, the Downlink Control Information, and the downlink data that are input from the higher layer processing unit 301, using the coding scheme that is prescribed in advance, such as the block coding, the convolutional coding, or the turbo coding, or using the coding scheme that is determined by the radio resource control unit 3011. The modulation unit 3073 performs the modulation on the coded bits that are input from the coding unit 3071, using the modulation scheme that is prescribed in advance, such as BPSK, QPSK, 16 QAM, or 64 QAM, or using the modulation scheme that is determined by the radio resource control unit 3011.

The downlink reference signal generation unit 3079 generates as the Downlink Reference Signal a sequence that is already known to the terminal device 1 and that is acquired according to a rule that is prescribed in advance based on the physical layer cell identifier (PCI) for identifying the base station apparatus 3, and the like. The multiplexing unit 3075 multiplexes a modulation symbol of each channel, which results from the modulation, and the generated Downlink Reference Signal. More precisely, the multiplexing unit 3075 maps a modulation symbol of each channel, which results from the modulation, and the generated Downlink Reference Signal, to resource elements.

The radio transmission unit 3077 performs the Inverse Fast Fourier Transform (IFFT) on a modulation symbol and the like that result from the multiplexing, generates an OFDM symbol, attaches a CP to the generated OFDM symbol, generates a digital signal in a baseband, converts the digital signal in the baseband into an analog signal, removes a superfluous frequency component using a low pass filter, performs up-converting into a carrier frequency, performs power amplification, and outputs a final result to the transmit and receive antenna unit 309 for transmission.

A terminal device according to the present embodiment, which is a terminal device that performs first communication (communication between a base station and a terminal) with E-UTRAN, and second communication (communication between terminals or D2D communication) between the terminal devices, includes a reception unit that receives information relating to resource allocation for the second communication and Downlink Control Information in which information relating to a transmission terminal is included, over a downlink in the first communication, and that performs reception processing for the second communication based on the information relating to the resource allocation, and a transmission unit that performs transmission processing in the second communication based on the information relating to the resource allocation, in which, which one of the reception processing and the transmission processing that are based on the information relating to the resource allocation is performed is determined based on the information relating to the transmission terminal.

Furthermore, a CRC parity bit that is scrambled by an RNTI which is different from an RNTI that is configured for the first communication is attached to the Downlink Control Information.

A terminal device according to the present embodiment, which is a base station apparatus that communicates with a terminal device, performs transmission of information relating to resource allocation and Downlink Control Information in which information relating to a transmission terminal is included, to the terminal device, in which, in communication between terminal devices among which there is the terminal device, the information relating to the transmission terminal is used for determining which one of the reception processing and the transmission processing that are based on the information relating to the resource allocation is performed.

Furthermore, an integrated circuit according to the present embodiment, which is an integrated circuit that is built into a terminal device which performs first communication with E-UTRAN, and second communication between terminal devices, includes a function of receiving information relating to resource allocation for the second communication and Downlink Control Information in which information relating to a transmission terminal is included, over a downlink in the first communication, and of performing reception processing in the second communication based on the information relating to the resource allocation, and a function of performing transmission processing in the second communication based on the information relating to the resource allocation, in which, which one of the reception processing and the transmission processing that are based on the information relating to the resource allocation is performed is determined based on the information relating to the transmission terminal.

Furthermore, an integrated circuit according to the present embodiment, which is an integrated circuit that is built into a base station apparatus that communicates with a terminal device, includes a function of transmitting information relating to resource allocation and Downlink Control Information in which information relating to a transmission terminal is included, to the terminal device, in which, in communication between terminal devices among which there is the terminal device, the information relating to the transmission terminal is used for determining which one of the reception processing and the transmission processing that are based on the information relating to the resource allocation is performed.

Furthermore, a communication method according to the present embodiment, which is a communication method that is used in a terminal device which performs first communication with E-UTRAN, and second communication between terminal devices, includes a method of receiving information relating to resource allocation for the second communication and Downlink Control Information in which information relating to a transmission terminal is included, over a downlink in the first communication, and of performing reception processing in the second communication based on the information relating to the resource allocation, and a transmission method in the second communication based on the information relating to the resource allocation, in which, which one of the reception processing and the transmission processing that are based on the information relating to the resource allocation is performed is determined based on the information relating to the transmission terminal.

A communication method, which is a communication method that is built into a base station apparatus that communicates with a terminal device, includes a transmission method of transmitting information relating to resource allocation and Downlink Control Information in which information relating to a transmission terminal is included, to the terminal device, in which, in communication between terminal devices among which there is the terminal device, the information relating to the transmission terminal is used for determining which one of the reception processing and the transmission processing that are based on the information relating to the resource allocation is performed.

Accordingly, the D2D can be efficiently performed between the terminal devices 1. Furthermore, the base station apparatus 3 can efficiently control the D2D between the terminal devices 1 using the cellular link.

A program running on the base station apparatus 3 and the terminal device 1 according to the present invention may be a program (a program for causing a computer to operate) that controls a Central Processing Unit (CPU) and the like in such a manner as to realize the function according to the embodiments of the present invention, which are described above. Then, pieces of information that are handled in the device and the apparatus are temporarily stored in a Random Access Memory (RAM) while being processed. Thereafter, the pieces of information are stored in various types of ROMs such as a Flash Read Only Memory (ROM), or a Hard Disk Drive (HDD) and, if need arises, are read by the CPU to be modified or rewritten.

Moreover, one portion of each of the terminal device 1 and the base station apparatus 3 according to the embodiments, which are described above, may be realized by the computer. In that case, this one portion may be realized by recording a program for realizing such a control function on a computer-readable medium and causing a computer system to read the program stored on the recording medium for execution.

Moreover, the "computer system" here is defined as a computer system that is built into the terminal device 1 or the base station apparatus 3 and as including an OS or hardware components such as a peripheral device. Furthermore, the "computer-readable recording medium" refers to a portable medium, such as a flexible disk, a magneto-optical disk, a ROM, and a CD-ROM, and a storage device, such as a hard disk, that is built into the computer system.

Additionally, the "computer-readable recording media" may include a medium that dynamically retains the program for a short period of time, such as a communication line that is available when transmitting the program over a network such as the Internet or over a communication network such as a telephone network, and a medium that retains the program for a fixed period of time, such as a volatile memory within the computer system, which functions as a server or a client in a case where the program is retained dynamically for a short period of time. Additionally, the program described above may be one for realizing some of the functions described above and additionally may be one that can realize the functions described above in combination with a program that is already recorded in the computer system.

Furthermore, the base station apparatus 3 according to the embodiment, which is described above, can be realized as an aggregation (an apparatus group) that is constituted from multiple apparatuses. Each of the apparatuses that constitute the apparatus group may be equipped with some portions or all portions of each function of, or some portions or all portions of each functional block of the base station apparatus 3 according to the embodiment, which is described above. The apparatus group itself may have each general function of or each general functional block of the base station apparatus 3. Furthermore, the terminal device 1 according to the embodiment, which is described above, is also capable of communicating with the base station apparatus as an aggregation.

Furthermore, the base station apparatus 3 according to the embodiment, which is described above, may also be referred to as an Evolved Universal Terrestrial Radio Access Network (EUTRAN). Furthermore, the base station apparatus 3 according to the embodiment, which is described above, may have some portions or all portions of a function of a node that is at a higher level than an eNodeB.

Furthermore, some portions or all portions of each of the terminal device 1 and the base station apparatus 3 according to the embodiment, which is described above, may be realized as an LSI that is a typical integrated circuit and may be realized as a chip set. Each functional block of the terminal device 1 and the base station apparatus 3 may be individually realized into a chip, and some, or all of the functional blocks may be integrated into a chip. Furthermore, a circuit integration technique is not limited to the LSI, and an integrated circuit for the functional block may be realized as a dedicated circuit or a general-purpose processor. Furthermore, if with advances in semiconductor technology, a circuit integration technology with which an LSI is replaced will appear, it is also possible to use an integrated circuit to which such a technology is applied.

Furthermore, according to the embodiments, which are described above, the terminal device is described as one example of a communication device, but the present invention is not limited to this, and can also be applied to a terminal device or a communication apparatus, such as a fixed-type electronic apparatus that is installed indoors or outdoors, or a stationary-type electronic apparatus, for example, an AV apparatus, a kitchen apparatus, a cleaning or washing machine, an air conditioner, office equipment, a vending machine, and other household apparatuses.

The embodiment of the invention is described in detail above referring to the drawings, but the specific configuration is not limited to the embodiment and also includes an amendment to a design and the like that fall within the scope that does not depart from the gist of the present invention. Furthermore, various modifications are possible within the scope of the present invention defined by claims, and embodiments that are implemented by suitably combining technical means that are disclosed according to different embodiments are also included in the technical scope of the present invention. Furthermore, a configuration in which a constituent element that achieves the same effect is substituted for the one that is described according to each of the embodiments described above is also included in the technical scope of the present invention.

INDUSTRIAL APPLICABILITY

Several aspects of the present invention can be applied to a terminal device, a base station apparatus, an integrated circuit, a communication method, and the like, in all of which transmission and reception of a D2D signal need to be efficiently performed.

DESCRIPTION OF REFERENCE NUMERALS 1 (1A, 1B, 1C) TERMINAL DEVICE
3 BASE STATION APPARATUS
4 TERMINAL DEVICE GROUP
4A, 4B, 4C, 4D TERMINAL DEVICE
101 HIGHER LAYER PROCESSING UNIT
103 CONTROL UNIT
105 RECEPTION UNIT
107 TRANSMISSION UNIT
109 TRANSMIT AND RECEIVE ANTENNA UNIT
301 HIGHER LAYER PROCESSING UNIT
303 CONTROL UNIT
305 RECEPTION UNIT
307 TRANSMISSION UNIT
309 TRANSMIT AND RECEIVE ANTENNA UNIT
1011 RADIO RESOURCE CONTROL UNIT
1013 SCHEDULING INFORMATION INTERPRETATION UNIT
1015 D2D CONTROL UNIT
3011 RADIO RESOURCE CONTROL UNIT
3013 SCHEDULING UNIT
3015 D2D CONTROL UNIT

The invention claimed is:

1. A terminal device that performs first communication with E-UTRAN, and second communication between terminal devices directly, the terminal device comprising:
reception circuitry configured to and/or programmed to:
receive first information and second information over a downlink in the first communication, and
perform reception processing in the second communication based on a first identity included in the first information; and
transmission circuitry configured to and/or programmed to perform transmission processing in the second communication based on a second identity included in the second information, wherein
the reception circuitry is configured to and/or programmed to receive allocation information for resource allocation to the second communication, the resource allocation included in downlink control information in the first communication,
the allocation information indicates a bitmap,
the bitmap indicates subframes for the second communication, and
a payload size of the downlink control information is the same as a payload size of second downlink control information, the second downlink control information including an uplink grant for the first communication.

2. A base station apparatus that communicates with a terminal device which performs second communication with each other directly, comprising:
transmission circuitry configured to and/or programmed to transmit first information and second information over a downlink in a first communication; wherein,
the first information includes a first identity for the terminal device to perform reception processing of the second communication,
the second information includes a second identity for the terminal device to perform transmission processing of the second communication,
the transmission circuitry is configured to and/or programmed to transmit allocation information for resource allocation to the second communication, the resource allocation included in downlink control information in the first communication,
the allocation information indicates a bitmap, the bitmap indicates subframes for the second communication, and
a payload size of the downlink control information is the same as a payload size of second downlink control information, the second downlink control information including an uplink grant for the first communication.

3. A communication method that is used in a terminal device which performs first communication with E-UTRAN, and second communication between terminal devices, the communication method comprising:
a reception method of:
receiving first information and second information over a downlink in the first communication, and
performing reception processing in the second communication based on a first identity included in the first information; and
a transmission method of performing transmission processing in the second communication based on a second identity included in the second information, wherein
the reception method further comprising:
receiving allocation information for resource allocation to the second communication, the resource allocation included in downlink control information in the first communication,
the allocation information indicating a bitmap, the bitmap indicating subframes for the second communication, and
a payload size of the downlink control information is the same as a payload size of second downlink control information, the second downlink control information including an uplink grant for the first communication.

4. A communication method for use in a base station apparatus that communicates with a terminal device which performs second communication with each other directly, the communication method comprising:
a transmission method of transmitting first information and second information over a downlink in a first communication; wherein,
the first information includes a first identity for the terminal device to perform reception processing of the second communication,
the second information includes a second identity for the terminal device to perform transmission processing of the second communication, and the transmission method further including transmitting allocation information for resource allocation to the second communication, the resource allocation included in downlink control information in the first communication, the allocation information indicating a bitmap, the bitmap indicating subframes for the second communication, and a payload size of the downlink control information being the same as a payload size of second downlink control information, the second downlink control information including an uplink grant for the first communication.

\* \* \* \* \*